US009331819B2

(12) United States Patent
Si et al.

(10) Patent No.: US 9,331,819 B2
(45) Date of Patent: May 3, 2016

(54) METHOD FOR IMPLEMENTING HARQ FEEDBACK, AND METHOD AND DEVICE FOR ALLOCATING UPLINK SUBFRAME

(71) Applicant: CHINA ACADEMY OF TELECOMMUNICATIONS TECHNOLOGY, Beijing (CN)

(72) Inventors: Qianqian Si, Beijing (CN); Zukang Shen, Beijing (CN); Yanan Lin, Beijing (CN); Xuejuan Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 35 days.

(21) Appl. No.: 14/388,792

(22) PCT Filed: Mar. 6, 2013

(86) PCT No.: PCT/CN2013/072238
§ 371 (c)(1),
(2) Date: Sep. 26, 2014

(87) PCT Pub. No.: WO2013/143378
PCT Pub. Date: Oct. 3, 2013

(65) Prior Publication Data
US 2015/0207594 A1 Jul. 23, 2015

(30) Foreign Application Priority Data

Mar. 26, 2012 (CN) .......................... 2012 1 0082993

(51) Int. Cl.
*H04L 1/18* (2006.01)
*H04L 5/14* (2006.01)

(52) U.S. Cl.
CPC ................ *H04L 1/1861* (2013.01); *H04L 5/14* (2013.01)

(58) Field of Classification Search
None
See application file for complete search history.

(56) References Cited

U.S. PATENT DOCUMENTS 8,341,481 B2 * 12/2012 Lee ....................... H04L 1/1854
370/312

(Continued)

FOREIGN PATENT DOCUMENTS

CN 101854662 A 10/2010
WO WO 2013/012215 A1 1/2013

OTHER PUBLICATIONS

PCT International Search Report for PCT Counterpart Application No. PCT/CN2013/072238, 5 pages (including English translation), (May 23, 2013).
PCT Written Opinion of the International Searching Authority for PCT Counterpart Application No. PCT/CN2013/072238, 11 pages (including English translation), (May 23, 2013).

(Continued)

*Primary Examiner* — Hong Cho
(74) *Attorney, Agent, or Firm* — Blakely, Sokoloff, Taylor & Zafman LLP

(57) ABSTRACT

Disclosed are a method for implementing HARQ feedback, and a method and device for allocating an uplink subframe. The method is: determining a TDD uplink/downlink reference configuration used for FDD PDSCH HARQ feedback, and allocating, according to the number of uplink subframes indicated by the TDD uplink/downlink reference configuration in a radio frame, an FDD downlink subframe corresponding to ACK/NACK information borne by an uplink subframe indicated by the TDD uplink/downlink reference configuration to the uplink subframe, so that numbers of FDD downlink subframes corresponding to ACK/NACK information borne by the uplink subframes indicated by the TDD uplink/downlink reference configuration are approximately equal. In this way, ACK/NACK information corresponding to downlink data can be timely and accurately fed back, so as to perform accurate data retransmission, thereby effectively ensuring the system performance.

12 Claims, 6 Drawing Sheets

(56) References Cited

U.S. PATENT DOCUMENTS

| | | | |
|---|---|---|---|
| 2009/0181689 A1* | 7/2009 | Lee | H04L 1/1854 |
| | | | 455/450 |
| 2010/0165939 A1* | 7/2010 | Lin | H04L 5/0053 |
| | | | 370/329 |
| 2011/0041027 A1* | 2/2011 | Fong | H04L 1/1812 |
| | | | 714/749 |
| 2011/0107170 A1 | 5/2011 | Park et al. | |
| 2012/0230268 A1* | 9/2012 | Marinier | H04L 5/0053 |
| | | | 370/329 |
| 2013/0242814 A1* | 9/2013 | Wang | H04L 1/1861 |
| | | | 370/280 |

OTHER PUBLICATIONS

Samsung, "UL HARQ-ACK Timing for TDD CA", 3GPP TSG RAN WG1 #68, R1-120158, Dresden, Germany, 4 pages, (Feb. 6-10, 2012).

European Patent Office Communication enclosing Extended European Search Report for corresponding European Patent Application No. 13767688.8, 7 pages, (Jan. 30, 2015).

Qualcomm Europe, "Support of ACK Repetition in the Uplink of E-UTRA", 3GPP TSG RAN1 #52, R1-080648, Sorrento, Italy, 2 pages, (Feb. 11-15, 2008).

* cited by examiner

--Prior Art--

--Prior Art--

METHOD FOR IMPLEMENTING HARQ FEEDBACK, AND METHOD AND DEVICE FOR ALLOCATING UPLINK SUBFRAME

CROSS-REFERENCE TO RELATED APPLICATIONS

This patent application is a U.S. National Stage Application under 35 U.S.C. §371 of International Application No. PCT/CN2013/072238, filed on Mar. 6, 2013, entitled METHOD FOR IMPLEMENTING HARQ FEEDBACK, AND METHOD AND DEVICE FOR ALLOCATING UPLINK SUBFRAME, designating the United States, and claiming the benefit of Chinese Patent Application No. 201210082993.2, filed with the Chinese Patent Office on Mar. 26, 2012, and entitled "method for implementing HARQ feedback, and method and device for allocating uplink sub-frame", which was incorporated by reference in its entirety.

FIELD OF THE INVENTION

The present invention relates to the field of communication and particularly to a method for implementing HARQ feedback, and a method and device for allocating sub-frame.

BACKGROUND OF THE INVENTION

Three duplex modes, Frequency Division Duplex (FDD), Half-FDD (H-FDD) and Time Division Duplex (TDD), are currently supported by Long Term Evolution (LTE) systems.

FDD refers to uplink transmission and downlink transmission in different carrier frequencies to allow concurrent reception and transmission of signals by a base station and a User Equipment (UE); and TDD refers to uplink transmission and downlink transmission in the same carrier frequency to allow transmission and reception of signals respectively by a base station and a user equipment in different periods of time, or allow reception and transmission of signals respectively by a base station and a user equipment in different periods of time.

In wireless communication system of LTE and earlier wireless communication systems, a cell is configured with only one carrier, and the maximum bandwidth in LTE system is 20 MHz, particularly as illustrated in FIG. 1.

Compared with the peak rate of LTE system, the peak rate of Long Term Evolution-Advanced (LTE-A) system improves significantly, wherein the peak rate of LTE-A system is required to be 1 Gbps in the downlink and 500 Mbps in the uplink. The required peak rates can not be reached with only one carrier with a maximum bandwidth of 20 MHz. Thus, the bandwidth available to the user equipment in LTE-A system needs to be extended, and in view of this, Carrier Aggregation (CA) technology has been introduced, that is, a plurality of consecutive or inconsecutive carriers in the same base station (eNB) are aggregated together to serve the UE concurrently with a desirable rate. These carriers aggregated together are also referred to as Component Carriers (CCs). Each cell can be a component carrier, and cells (component carriers) in different eNBs can not be aggregated.

In order to ensure the UE of the LTE system to be able to operate over each of the aggregated carriers, the bandwidth of each aggregated carrier is no more than 20 MHz, particularly as illustrated in FIG. 2. There are four carriers that can be aggregated in the base station of LTE-A system as illustrated in FIG. 2 so that the base station can transmit data with the user equipment over the four carriers concurrently to thereby improve the throughput of the system.

In the LTE system, the length of a radio frame is 10 ms and the length of a sub-frame is 1 ms in both the FDD mode and the TDD mode. Seven TDD uplink and downlink configurations are defined for a radio frame in each of the TDD modes, particularly as depicted in Table 1, where D represents a downlink (DL) sub-frame, U represents an uplink (UL) sub-frame, and S represents a special sub-frame of the TDD system.

TABLE 1

(TDD uplink/downlink configurations)

| TDD uplink/downlink configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In FDD mode of LTE system, a user equipment receives downlink data in sub-frame n−4 and feeds back signaling of whether the data in the downlink sub-frame needs to be retransmitted, that is, feeds back Acknowledgement/Negative Acknowledgement (ACK/NACK) information, also referred to as a Physical Downlink Shared Channel Hybrid Automatic Repeat ReQuest (PDSCH HARQ), in the uplink sub-frame n. When carriers are aggregated, ACK/NACK information corresponding to a plurality of downlink carriers in the sub-frame n−4 will be fed back in uplink sub-frame n in a primary carrier concurrently.

In TDD mode of LTE system, a UE may feed back, ACK/NACK information corresponding to a plurality of downlink sub-frames, in the same uplink sub-frame, that is, the UE detects Physical Downlink Shared Channel (PDSCH) transmission, or Physical Downlink Control Channel (PDCCH) indicating downlink semi-persistent scheduling release, in the downlink sub-frame n−k and feeds back corresponding ACK/NACK information in the uplink sub-frame n, wherein k∈K, and values in the set K depend upon a TDD uplink and downlink configuration of the system and a particular sub-frame index, particularly as depicted in Table 2; and particularly special sub-frames of special sub-frame configuration 0 and 5 with a normal Cyclic Prefix (CP) and special sub-frames of special sub-frame configuration 0 and 4 with an extended CP have no ACK/NACK feedback, that is, the user equipment will not feed back ACK/NACK information for such special sub-frames.

TABLE 2

(related TDD downlink K values: $\{k_0, k_1, \ldots k_{M-1}\}$)

| uplink/downlink configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |

TABLE 2-continued (related TDD downlink K values: {$k_0, k_1, \ldots k_{M-1}$})

| uplink/downlink configuration | Sub-frame index | | | | | | | | | |
|---|---|---|---|---|---|---|---|---|---|---|
| | 0 | 1 | 2 | 3 | 4 | 5 | 6 | 7 | 8 | 9 |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 2 reflects a PDSCH HARQ feedback timing indicated by a TDD uplink and downlink configuration. In LTE system, a plurality of radio frames are arranged in order, although Table 2 only takes a radio frame as an example and depicts values of K corresponding to respective uplink sub-frames, wherein n−k<0 indicates the last k-th downlink sub-frame in a preceding radio frame, for example, with n=2 and k=6, uplink sub-frame 2 in radio frame a carries ACK/NACK information corresponding to downlink sub-frame 6 in radio frame a−1.

However, there is not a solution to implement carrier aggregation across systems in the LTE system currently, and as a result, there is no HARQ feedback solution for downlink data when carrier aggregation is performed among TDD system and FDD system so far.

SUMMARY OF THE INVENTION

Embodiments of the present invention provide a method for implementing HARQ feedback, and a method and device for allocating sub-frames so as to provide an HARQ feedback smoothly when carrier aggregation is performed across systems.

Technical solutions provided by embodiments of the present invention are as follows.

A method for allocating sub-frames for a Hybrid Automatic Repeat ReQuest (HARQ) feedback includes:
choosing a Time Division Duplex (TDD) uplink and downlink reference configuration used to determines an HARQ feedback timing for Physical Downlink Shared Channel (PDSCH) of a Frequency Division Duplex (FDD) downlink carrier; and
allocating FDD downlink sub-frames to uplink sub-frames indicated by the TDD uplink and downlink reference configuration, according to number of the uplink sub-frames in a radio frame, so that numbers of FDD downlink sub-frames corresponding to respective uplink sub-frames indicated by the TDD uplink and downlink reference configuration are substantially equal, wherein Acknowledgement/Negative Acknowledgement, ACK/NACK, information corresponding to the FDD downlink sub-frames is carried in corresponding allocated uplink sub-frame.

A Hybrid Automatic Repeat ReQuest (HARQ) feedback method includes:
determining ACK/NACK information of FDD downlink sub-frames to be carried in uplink sub-frames indicated by the TDD uplink and downlink reference configuration according to a result of sub-frames allocation; and
transmitting the ACK/NACK information in corresponding uplink sub-frames.

A Hybrid Automatic Repeat ReQuest (HARQ) feedback method includes:
determining ACK/NACK information of FDD downlink sub-frames to be carried in uplink sub-frames indicated by a TDD uplink and downlink reference configuration, according to a result of allocating the FDD downlink sub-frames; and
receiving the ACK/NACK information in corresponding uplink sub-frames.

A device for allocating sub-frames for a Hybrid Automatic Repeat ReQuest (HARQ) feedback includes:
a first determination component configured to choose a Time Division Duplex, TDD, uplink and downlink reference configuration used to determine an HARQ feedback timing for Physical Downlink Shared Channel, PDSCH, of a Frequency Division Duplex, FDD, downlink carrier; and
a second determination component configured to allocate FDD downlink sub-frames to uplink sub-frames indicated by the TDD uplink and downlink reference configuration, according to number of the uplink sub-frames in a radio frame, so that numbers of FDD downlink sub-frames corresponding to respective uplink sub-frames indicated by the TDD uplink and downlink reference configuration are substantially equal, wherein Acknowledgement/Negative Acknowledgement, ACK/NACK, information corresponding to the FDD downlink sub-frames is carried in corresponding allocated uplink sub-frame.

A Hybrid Automatic Repeat ReQuest (HARQ) feedback device includes:
a third determination component configured to determine ACK/NACK information of FDD downlink sub-frames to be carried in uplink sub-frames indicated by a TDD uplink and downlink reference configuration, according to a result of allocating the FDD downlink sub-frames; and
a communication component configured to transmit the ACK/NACK information in corresponding uplink sub-frames.

A Hybrid Automatic Repeat ReQuest (HARQ) feedback device includes:
a third determination component configured to determine ACK/NACK information of FDD downlink sub-frames to be carried in uplink sub-frames indicated by a TDD uplink and downlink reference configuration, according to a result of allocating the FDD downlink sub-frames; and a communication component configured to receive the ACK/NACK information in corresponding uplink sub-frames.

In summary, in the embodiments of the present invention, a PDSCH HARQ feedback solution has been devised in an application scenario where a TDD carrier is aggregated with an FDD DL carrier, wherein the user equipment allocates ACK/NACK information, corresponding to the FDD downlink sub-frames, to the uplink sub-frames indicated by the chose TDD uplink and downlink reference configuration used to determine an HARQ feedback timing for PDSCH of the FDD downlink carrier, according to the number of uplink sub-frames, indicated by the chose TDD uplink and downlink reference configuration, in a radio frame based upon the TDD uplink and downlink reference configuration, so that the numbers of FDD downlink sub-frames corresponding to ACK/NACK information carried by the respective uplink sub-frames indicated by the TDD uplink and downlink reference configuration are substantially equal, and further the ACK/NACK information allocated to the respective uplink sub-frames is fed back in the uplink sub-frames; and correspondingly the base station receives the ACK/NACK information fed back from the user equipment side in an alike way. Thus the user equipment can feed back the ACK/NACK information corresponding to downlink data timely and accurately to the base station, so that the base station can retransmit the data accurately according to the obtained ACK/NACK information to thereby guarantee effectively the performance of the system. Moreover, with the allocation method according to the embodiment of the present invention, the ACK/NACK information can be allocated to the TDD uplink sub-frames as uniformly as possible to thereby make the resources in the system to be allocated more evenly.

DETAILED DESCRIPTION OF THE EMBODIMENTS

For an application scenario with carrier aggregation across systems, a novel HARQ feedback solution is devised in embodiments of the present invention, and with the HARQ feedback solution provided by the embodiments of the present invention, ACK/NACK information corresponding to sub-frames in an FDD downlink carrier (i.e., FDD downlink sub-frames) can be allocated uniformly to uplink sub-frames for carrying HARQ feedback information over a TDD carrier to thereby allocate the resources of the system more evenly.

Preferred embodiments of the present invention will be described below in details with reference to the drawings.

Figure 1:
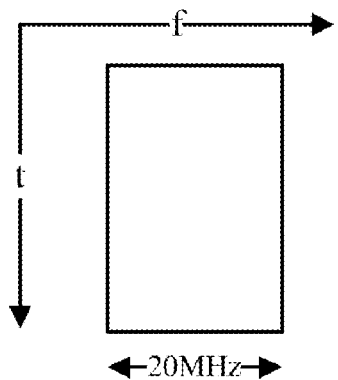
FIG. 1 is a schematic diagram of distribution of a carrier in the LTE system in the prior art.
Figure 2:
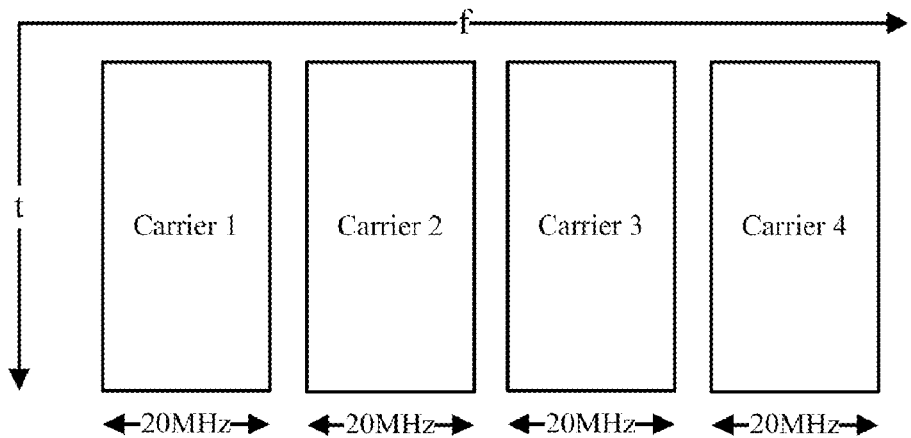
FIG. 2 is a schematic diagram of distribution of carriers in the LTE-A system with CA technology in the prior art.
Figure 3:
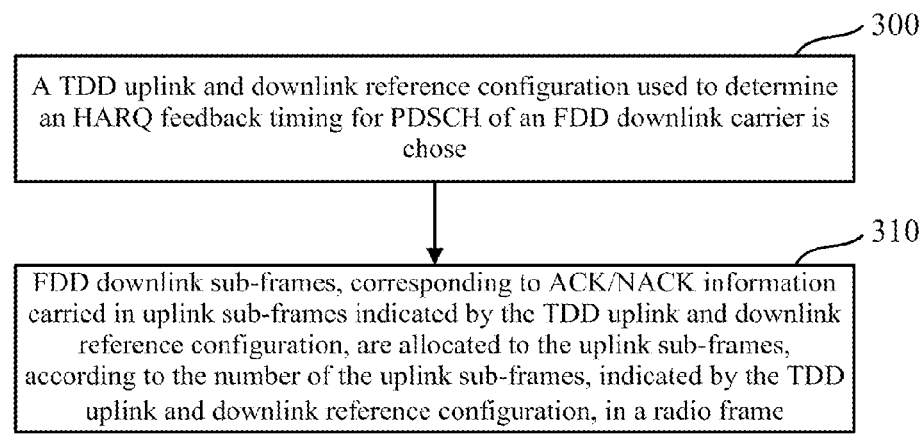
FIG. 3 is a flow chart of a method for allocating FDD downlink sub-frames for uplink sub-frames used to determine an HARQ feedback timing according to an embodiment of the present invention.

In the embodiments of the present invention, preferably the TDD carrier is aggregated as a primary carrier with the FDD downlink carrier, that is, the corresponding ACK/NACK information can only be transmitted over the primary carrier (i.e., the TDD carrier) when a PDSCH HARQ feedback is provided for the FDD downlink carrier, and then reference is made to FIG. 3.

A detailed flow of a method for allocating sub-frames for a PDSCH HARQ feedback is as follows.

Step 300: a TDD uplink and downlink reference configuration used to determine an HARQ feedback timing for PDSCH of an FDD downlink carrier is chose, that is, uplink sub-frames, in a TDD carrier, carrying ACK/NACK information corresponding to the FDD downlink carrier are determined. For the sake of a convenient description, in the following embodiment, "a TDD uplink and downlink reference configuration used to determine an HARQ feedback timing for PDSCH of an FDD downlink carrier" will be referred simply to as "a TDD uplink and downlink reference configuration corresponding to an FDD carrier" or can be further referred to as "a TDD uplink and downlink reference configuration" for short.

In this embodiment, preferably, the TDD uplink and downlink reference configuration can be one of the seven indicated configurations supported by the LTE TDD system, particularly as depicted in Table 1, but will not be limited thereto. Details will be given below.

The TDD uplink and downlink configuration in use of the TDD carrier can be determined as the TDD uplink and downlink reference configuration; the TDD uplink and downlink configuration configured for a PDSCH HARQ feedback of the TDD carrier can be determined as the TDD uplink and downlink reference configuration (which may be different from the TDD uplink-downlink configuration in use of the TDD carrier); or a TDD uplink and downlink configuration configured by higher-layer signaling from the network side can be determined as the TDD uplink and downlink reference configuration, wherein all uplink sub-frames included in the TDD uplink and downlink configuration configured by higher-layer signaling are a subset of all uplink sub-frames included by the primary carrier; or a TDD uplink and downlink configuration determined in a predetermined pattern can be determined as the TDD uplink and downlink reference configuration, for example, TDD uplink and downlink configuration 5 is prescribed as the TDD uplink and downlink reference configuration all the time, or TDD uplink and downlink configuration 2 is prescribed as the TDD uplink and downlink reference configuration when the TDD carrier is configured with a switching point of 5 ms, or TDD uplink and downlink configuration 5 is prescribed as the TDD uplink and downlink reference configuration when the TDD carrier is configured with a switching point of 10 ms.

Step 310: FDD downlink sub-frames, corresponding to ACK/NACK information carried in uplink sub-frames indicated by the TDD uplink and downlink reference configuration, are allocated to the uplink sub-frames, according to the number of the uplink sub-frames, indicated by the TDD uplink and downlink reference configuration, in a radio frame, so that the numbers of FDD downlink sub-frames corresponding to ACK/NACK information carried in the respective uplink sub-frames indicated by the TDD uplink and downlink reference configuration are substantially equal.

The numbers of FDD downlink sub-frames corresponding to ACK/NACK information carried in the respective uplink sub-frames being substantially equal, refers to the difference of the numbers of FDD downlink sub-frames corresponding to ACK/NACK information carried in the respective uplink sub-frames being no more than a prescribed value or the numbers of FDD downlink sub-frames corresponding to ACK/NACK information carried in the respective uplink sub-frames being exactly equal.

In order to make the numbers of FDD downlink sub-frames corresponding to ACK/NACK information carried in the respective uplink sub-frames indicated by the TDD uplink and downlink reference configuration substantially equal, the following allocation rules are provided according to the embodiment of the present invention:

A first rule is that an FDD downlink sub-frame corresponds to one and only uplink sub-frame of the TDD carrier.

A second rule is that ACK/NACK information corresponding to any FDD downlink sub-frame m is carried and fed back in an uplink sub-frame succeeding to m+3 in the TDD carrier.

A third rule is that if FDD downlink sub-frame m precedes to FDD downlink sub-frame n, then uplink sub-frame m' of the TDD carrier corresponding to FDD downlink sub-frame m precedes to uplink sub-frame n' of the TDD carrier corresponding to FDD downlink sub-frame n, or FDD downlink sub-frame m and FDD downlink sub-frame n correspond to the same uplink sub-frames of the same TDD carrier, wherein the uplink sub-frame of the TDD carrier corresponding to the FDD downlink sub-frame refers to an uplink sub-frame, of the TDD carrier, carrying ACK/NACK information corresponding to the FDD downlink sub-frame.

A fourth rule is that there are x sets of consecutive uplink sub-frames in radio frame a of the TDD carrier, wherein x represents the number of sets of consecutive uplink sub-frames in a radio frame, and in each of the sets of consecutive uplink sub-frames:

Each of $N_{more,i} = \lceil \mod(10, N_{UL})/x \rceil$ uplink sub-frames can carry ACK/NACK information corresponding to at most $\lceil 10/N_{UL} \rceil$ consecutive downlink sub-frames of the FDD carrier;

Each of the remaining uplink sub-frames $N_{less,i}$ can carry ACK/NACK information corresponding to at most $\lfloor 10/N_{UL} \rfloor$ consecutive downlink sub-frames of the FDD carrier; and The last uplink sub-frame n carries ACK/NACK information corresponding to FDD downlink sub-frame n−4 and $\lceil 10/N_{UL} \rceil - 1$ (when uplink sub-frame n corresponds to $\lceil 10/N_{UL} \rceil$ consecutive FDD downlink sub-frames) FDD downlink sub-frames preceding to FDD downlink sub-frame n−4, or the last uplink sub-frame n carries ACK/NACK information corresponding to FDD downlink sub-frame n−4 and $\lfloor 10/N_{UL} \rfloor - 1$ (when uplink sub-frame n corresponds to $\lfloor 10/N_{UL} \rfloor$ consecutive FDD downlink sub-frames) FDD downlink sub-frames preceding to FDD downlink sub-frame n−4; and then consecutive FDD downlink sub-frames corresponding to uplink sub-frames n−i, i=1, 2, . . . can be determined in order, according to the largest number of consecutive FDD downlink sub-frames that can be carried by each uplink sub-frame, as long as downlink sub-frames corresponding to consecutive uplink sub-frames are also consecutive.

Wherein m and n represent sub-frame indexes, $N_{UL}$ represents the number of uplink sub-frames in radio frame a, the sum of $N_{more,i}$ and $N_{less,i}$ represents the number of consecutive uplink sub-frames in the i-th set in radio frame a, and i=1, 2, . . . x.

Figure 3A:
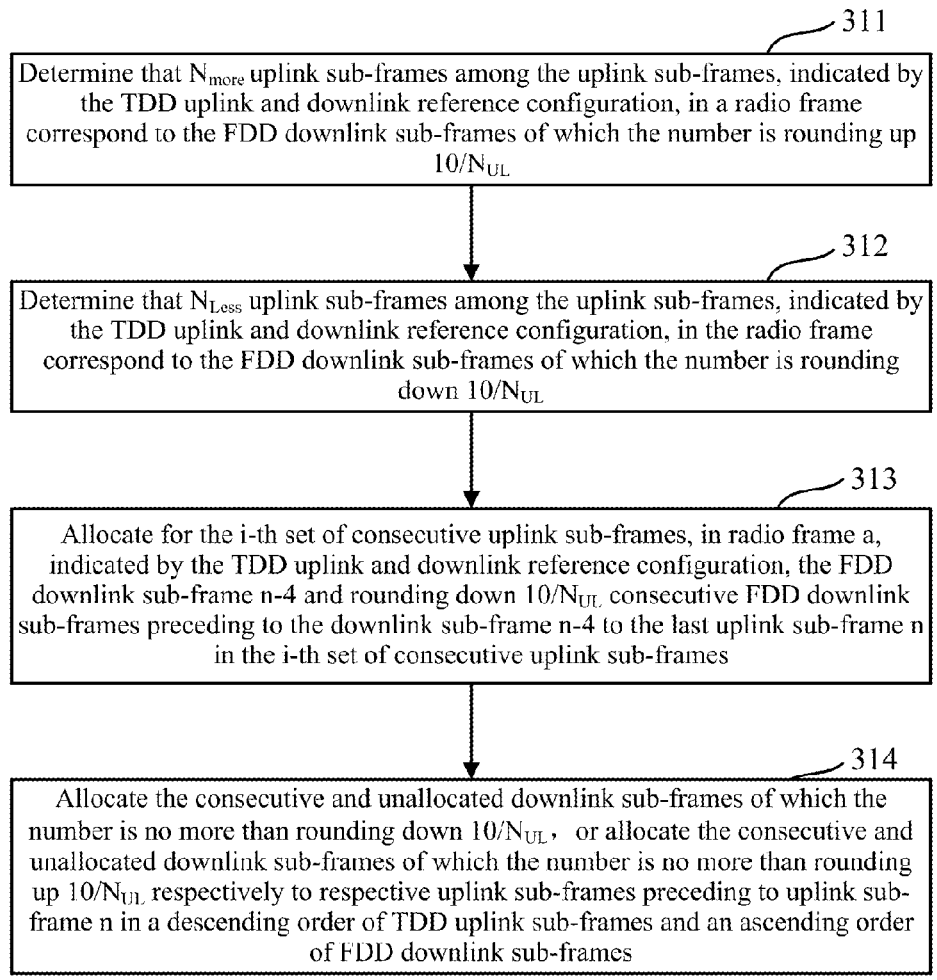
FIG. 3a is a flow chart of a method for allocating ACK/NACK information corresponding to FDD downlink sub-frames for uplink sub-frames indicated by a TDD uplink and downlink reference configuration according to an embodiment of the present invention.

As per the allocation rules described above, in the embodiment of the present invention, a particular preferred implementation of the step 310 as illustrated in FIG. 3a includes:

Step 311 is to determine that $N_{more}$ uplink sub-frames among the uplink sub-frames, indicated by the TDD uplink and downlink reference configuration, in a radio frame correspond to $\lceil 10/N_{UL} \rceil$ FDD downlink sub-frames corresponding to ACK/NACK information carried in the uplink sub-frames, and preferably, $N_{more} \mod(10, N_{UL})$.

Wherein step 311 further includes:

determining that a first part of uplink sub-frames in the sets of consecutive uplink sub-frames included in the uplink sub-frames, indicated by the above TDD uplink and downlink reference configuration, in the radio frame, correspond to $\lceil 10/N_{UL} \rceil$ FDD downlink sub-frames corresponding to ACK/NACK information carried in the uplink sub-frames; and The number of the first part of uplink sub-frames is $N_{more,i} = \lceil \mod(10, N_{UL})/x \rceil$, and $$N_{more} = \sum_{i=0}^{x-1} N_{more,i}.$$

Step 312 is to determine that $N_{less}$ uplink sub-frames among the uplink sub-frames, indicated by the above TDD uplink and downlink reference configuration, in the radio frame correspond to $\lceil 10/N_{UL} \rceil$ FDD downlink sub-frames corresponding to ACK/NACK information carried in the uplink sub-frames, wherein $N_{less} = N_{UL} - N_{more}$. The total of FDD downlink sub-frames corresponding to the $N_{UL}$ uplink sub-frames indicated by the TDD uplink and downlink reference configuration is 10.

Wherein step 311 further includes:

It is determined that a second part of uplink sub-frames in the set of consecutive uplink sub-frames included in the uplink sub-frames, indicated by the above TDD uplink and downlink reference configuration, in the radio frame, correspond to $\lfloor 10/N_{UL} \rfloor$ FDD downlink sub-frames corresponding to ACK/NACK information carried in the uplink sub-frames; and The number of the second part of uplink sub-frames is $N_{less,i}$, and the sum of $N_{less,i}$ and $N_{more,i}$ is the number of uplink sub-frames included in the set of consecutive uplink sub-frames, and $$N_{less} = \sum_{i=0}^{x-1} N_{less,i}.$$

Preferably, the first part of uplink sub-frames are the $1^{st}$ to the $N_{more,i}$-th uplink sub-frames in the set of consecutive uplink sub-frames, and the second part of uplink sub-frames are $N_{less,i}$ uplink sub-frames, succeeding to the first part of uplink sub-frames, in the sets of consecutive uplink sub-frames.

Step 313 is to allocate for the i-th set of consecutive uplink sub-frames, in radio frame a, indicated by the above TDD uplink and downlink reference configuration, FDD downlink sub-frame n−4 and $\lfloor 10/N_{UL} \rfloor - 1$ consecutive FDD downlink sub-frames, preceding to the FDD downlink sub-frame n−4, corresponding to ACK/NACK information carried in the uplink sub-frame, to the last uplink sub-frame n in the i-th set of consecutive uplink sub-frames.

Figure 4:
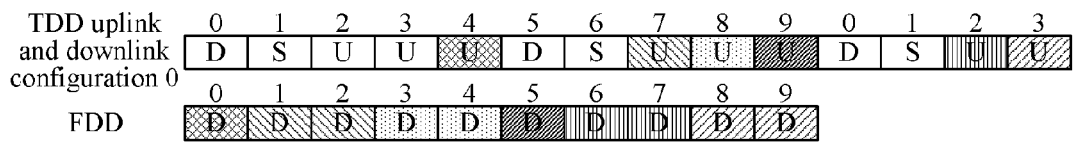
FIG. 4 to FIG. 10 are timing of HARQ feedbacks corresponding to FDD carrier downlink sub-frames in various TDD uplink and downlink reference configurations according to embodiments of the present invention.

Referring to FIG. 4, for example, assuming that the TDD uplink and downlink reference configuration is TDD uplink and downlink configuration 0, there are $N_{UL}=6$ uplink sub-frames, including x=2 sets of consecutive uplink sub-frames, in radio frame a of TDD, and the last uplink sub-frame n=9 in the i-th=$2^{nd}$ set corresponds to FDD downlink sub-frames including downlink sub-frame 5 and $\lceil 10/N_{UL} \rceil - 1 = 0$ downlink sub-frames preceding to downlink sub-frame 5, so ACK/NACK information corresponding to FDD downlink sub-frame 5 is allocated to uplink sub-frame 9 indicated by TDD uplink and downlink configuration 0 in step 313.

Step 314 is to allocate $\lfloor 10/N_{UL} \rfloor$ consecutive and unallocated FDD downlink sub-frames corresponding to ACK/NACK information carried in respective uplink sub-frames preceding to uplink sub-frame n or allocate $\rceil 10/N_{UL} \rceil$ consecutive and unallocated FDD downlink sub-frames corresponding to ACK/NACK information carried in respective uplink sub-frames preceding to uplink sub-frame n to the respective uplink sub-frames preceding to uplink sub-frame n in a descending order of TDD uplink sub-frames and an ascending order of FDD downlink sub-frames.

Firstly, $\emptyset 10/N_{UL}$ ] consecutive and unallocated FDD downlink sub-frames corresponding to ACK/NACK information carried in $N_{less,i}-1$ consecutive uplink sub-frames preceding to uplink sub-frame n are allocated respectively to the $N_{less,i}-1$ consecutive uplink sub-frames, and then $\lceil 10/N_{UL} \rceil$ consecutive and unallocated FDD downlink sub-frames corresponding to ACK/NACK information carried in $N_{more,i}$ consecutive uplink sub-frames are allocated respectively to the $N_{more,i}$ consecutive uplink sub-frames.

Referring to FIG. 4, assuming that the TDD uplink and downlink reference configuration is TDD uplink and downlink configuration 0, there are N=6 uplink sub-frames, including x=2 sets of consecutive uplink sub-frames, in radio frame a of TDD, and there are three consecutive uplink sub-frames in the i-th=$2^{nd}$ set (that is, the sum of $N_{more,i}$ and $N_{less,i}$ is 3), wherein $N_{more,i}=\mod(10,N_{UL})/x=2$ and $N_{less,i}=1$, so ACK/NACK information corresponding to FDD downlink sub-frame 4 and downlink sub-frame 3 is allocated to uplink sub-frame 8 after ACK/NACK information is allocated to uplink sub-frame 9 in step 313.

A result of the flow described above will be described below in details for specific application scenarios.

ACK/NACK information corresponding to FDD downlink sub-frame n−k is carried correspondingly in uplink sub-frame n indicated by the TDD uplink and downlink reference configuration, wherein k∈K, and:

1) If the TDD uplink and downlink reference configuration corresponding to the FDD carrier is TDD uplink and downlink configuration 0, and $N_{more}=4, N_{less}=2, \lceil 10/N_{UL} \rceil=2, \lfloor 10/N_{UL} \rfloor=1$, Then K={6, 5} with n=2 and 7, K={5, 4} with n=3 and 8, and K={4} with n=4 and 9, particularly as illustrated in FIG. 4.

Or

Figure 5:
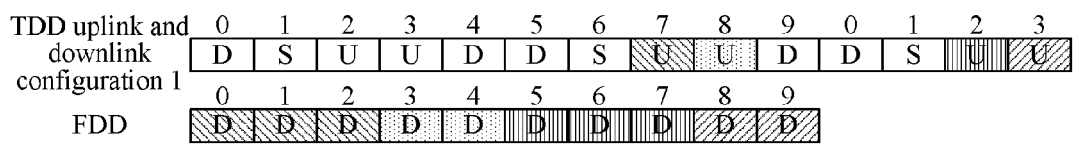

2) If the TDD uplink and downlink reference configuration corresponding to the FDD carrier is TDD uplink and downlink configuration 1, and $N_{more}=2, N_{less}=2, \lceil 10/N_{UL} \rceil=3, \lfloor 10/N_{UL} \rfloor=2$, Then K={7,6,5} with n=2 and 7, and K={5,4} with n=3 and 8, particularly as illustrated in FIG. 5.

Or

Figure 6:
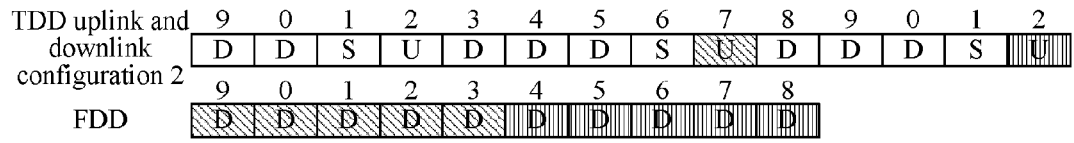

3) If the TDD uplink and downlink reference configuration corresponding to the FDD carrier is TDD uplink and downlink configuration 2, and $N_{more}=0, N_{less}=2, \lfloor 10/N_{UL} \rfloor=5$, Then K={8,7,6,5,4} with n=2 and 7, particularly as illustrated in FIG. 6.

Or

Figure 7:
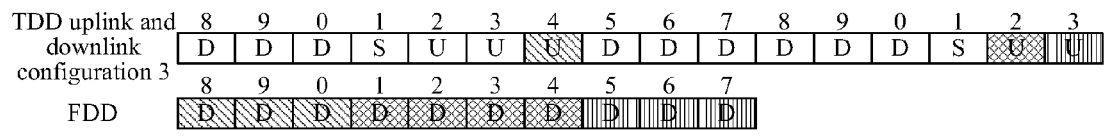

4) If the TDD uplink and downlink reference configuration corresponding to the FDD carrier is TDD uplink and downlink configuration 3, and $N_{more}=1, N_{less}=2, \lceil 10/N_{UL} \rceil=3$, Then K={11,10,9,8} with n=2, K={8,7,6} with n=3, and K={6,5,4} with n=4, particularly as illustrated in FIG. 7.

Or

Figure 8:
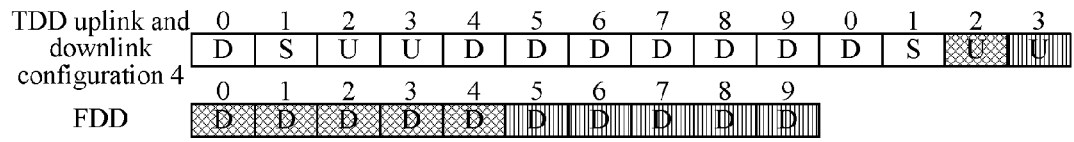

5) If the TDD uplink and downlink reference configuration corresponding to the FDD carrier is TDD uplink and downlink configuration 4, and $N_{more}=0, N_{less}=2, \lfloor 10/N_{UL} \rfloor=5$, Then K={12,11,10,9,8} with n=2, and K={8,7,6,5,4} with n=3, particularly as illustrated in FIG. 8.

Or

Figure 9:
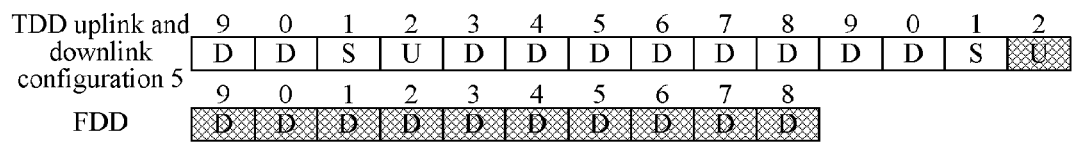

6) If the TDD uplink and downlink reference configuration corresponding to the FDD carrier is TDD uplink and downlink configuration 5, and $N_{more}=0, N_{less}=1, \lfloor 10/N_{UL} \rfloor=10$, Then K={13,12,11,10,9,8,7,6,5,4} with n=2, particularly as illustrated in FIG. 9.

Or

Figure 10:
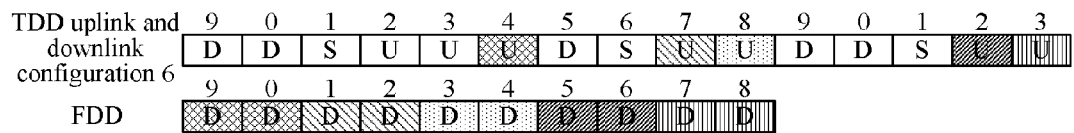

7) If the TDD uplink and downlink reference configuration corresponding to the FDD carrier is the TDD uplink and downlink configuration 6, and $N_{more}=0, N_{less}=5, \lfloor 10/N_{UL} \rfloor=2$, Then K={7,6} with n=2, K={6,5} with n=3 and 7, and K={5,4} with n=4 and 8, particularly as illustrated in FIG. 10.

Wherein the order of the respective elements in the set K can be changed, and reference can be made to the relevant description of Table 2 for processing with n−k<0, so a repeated description thereof will be omitted here.

Figure 11:
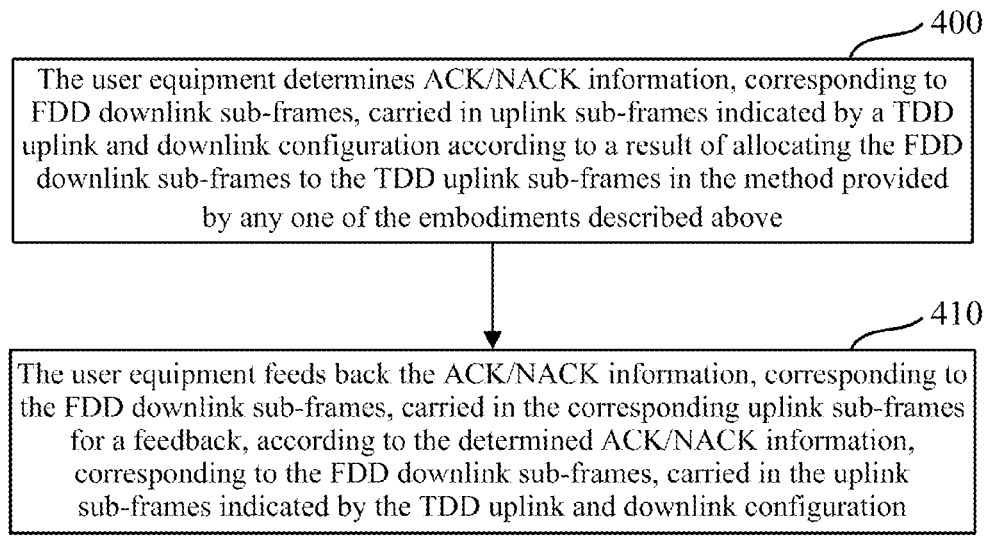
FIG. 11 is a flow chart of an HARQ feedback method implemented by a user equipment according to an embodiment of the present invention.

Based upon the allocation method according to the embodiment of the present invention described above, referring to FIG. 11, a detailed flow of an HARQ feedback method of a user equipment is as follows:

In step 400, the user equipment determines ACK/NACK information, corresponding to FDD downlink sub-frames, carried in uplink sub-frames indicated by a TDD uplink and downlink configuration according to a result of allocating the FDD downlink sub-frames to the TDD uplink sub-frames in the method provided by any one of the embodiments described above.

In step 410, the user equipment feeds back the ACK/NACK information, corresponding to the FDD downlink sub-frames, carried in the corresponding uplink sub-frames, according to the determined ACK/NACK information, corresponding to the FDD downlink sub-frames, carried in the uplink sub-frames indicated by the TDD uplink and downlink configuration.

Correspondingly, in the embodiment of the present invention, a base station also needs to determine the allocation of the ACK/NACK information to the uplink sub-frames and receives the ACK/NACK information fed back by the user equipment in a corresponding method.

Figure 12:
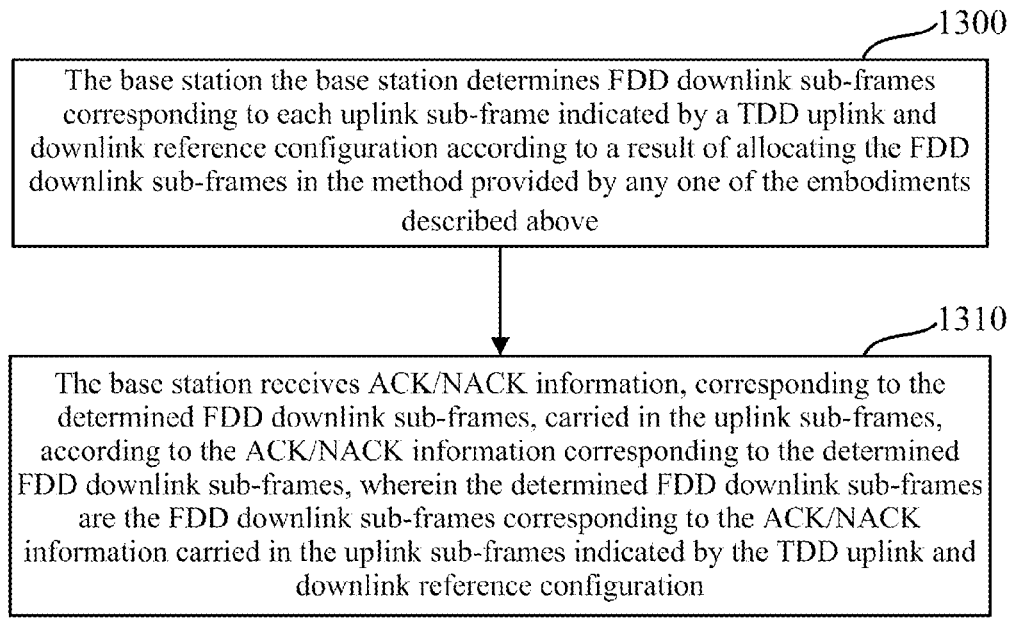
FIG. 12 is a flow chart of an HARQ feedback method implemented by a base station according to an embodiment of the present invention.

Based upon the allocation method provided by embodiments of the present invention described above, referring to FIG. 12, a detailed flow of an HARQ feedback method of a base station is as follows:

In step 1300, the base station determines FDD downlink sub-frames corresponding to each uplink sub-frame indicated by a TDD uplink and downlink reference configuration according to a result of allocating the FDD downlink sub-frames in the method provided by any one of the embodiments described above.

In step 1310, the base station receives ACK/NACK information, corresponding to the determined FDD downlink sub-frames, carried in the uplink sub-frames, according to the ACK/NACK information corresponding to the determined FDD downlink sub-frames, wherein the determined FDD downlink sub-frames are the FDD downlink sub-frames corresponding to the ACK/NACK information carried in the uplink sub-frames indicated by the TDD uplink and downlink reference configuration.

The number of ACK/NACK bits carried in the same uplink sub-frame is $$N_{ACK/NACK} = \sum_{c=0}^{C-1} N_{subframe,c},$$

wherein $N_{subframe,c}$ represents the number of downlink sub-frame for which ACK/NACK information is fed back in the uplink sub-frame in carrier c.

Figure 13:
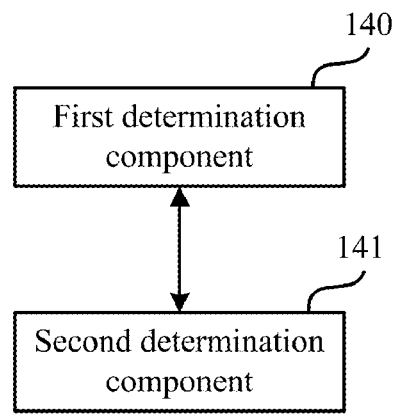
FIG. 13 is a schematic structural diagram of function structure of a first user equipment according to an embodiment of the present invention.
Figure 14:
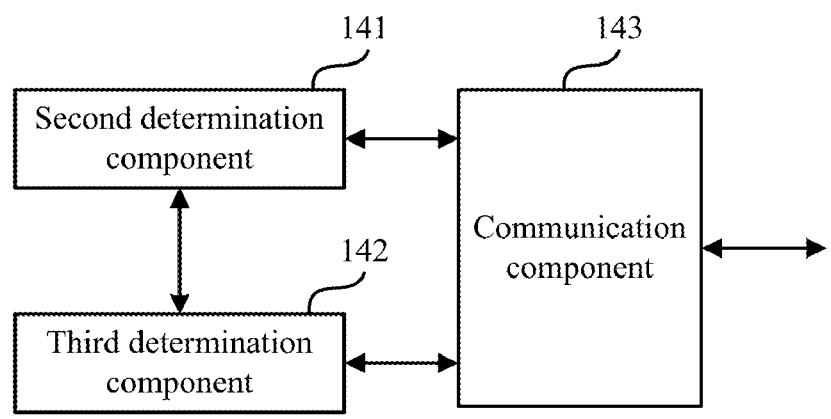
FIG. 14 is a schematic structural diagram of function structure of a second user equipment according to an embodiment of the present invention.

Based upon the embodiment described above, referring to FIG. 13 and FIG. 14, an embodiment of the present invention provides a user equipment including:

A first determination component 140 and a second determination component 141, wherein:

The first determination component 140 is configured to determine a TDD uplink and downlink reference configuration used to determine an HARQ feedback timing for PDSCH of an FDD downlink carrier; and The second determination component 141 is configured to allocate FDD downlink sub-frames to uplink sub-frames indicated by the TDD uplink and downlink reference configuration, according to number of the uplink sub-frames in a radio frame, so that numbers of FDD downlink sub-frames corresponding to respective uplink sub-frames indicated by the TDD uplink and downlink reference configuration are substantially equal, wherein the ACK/NACK information corresponding to the FDD downlink sub-frames is carried in corresponding allocated uplink sub-frame.

Furthermore the user equipment further includes a third determination component 142 configured to determine ACK/NACK information, corresponding to the FDD downlink sub-frames, carried in the uplink sub-frames indicated by the TDD uplink and downlink configuration, according to a result of allocating the FDD downlink sub-frames by the second determination component 141. Correspondingly the user equipment further includes a communication component 143 configured to transmit the ACK/NACK information in corresponding uplink sub-frames.

Figure 15:
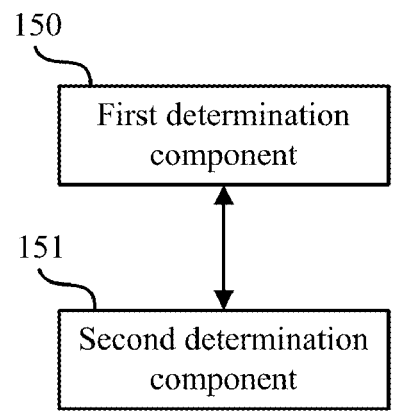
FIG. 15 is a schematic structural diagram of function structure of a first base station according to an embodiment of the present invention.
Figure 16:
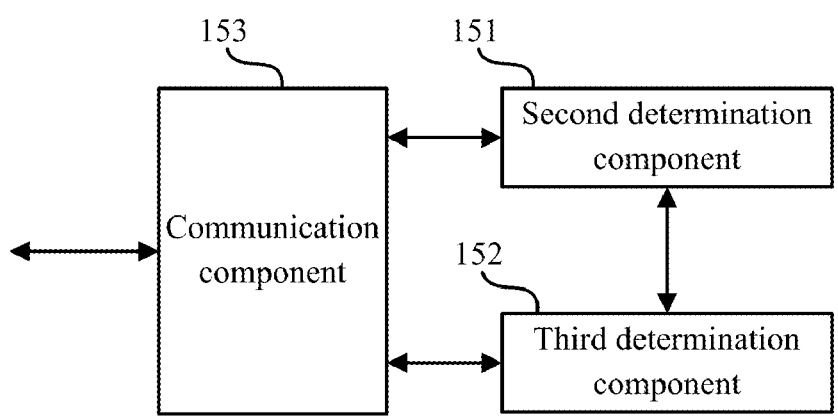
FIG. 16 is a schematic structural diagram of function structure of a second base station according to an embodiment of the present invention.

Referring to FIG. 15 and FIG. 16, a base station includes a first determination component 150 and a second determination component 151, wherein:

The first determination component 150 is configured to determine a TDD uplink and downlink reference configuration used to determine, at the user equipment side, an HARQ feedback timing for PDSCH of an FDD downlink carrier; and The second determination component 151 is configured to allocate FDD downlink sub-frames to uplink sub-frames indicated by the TDD uplink and downlink reference configuration, according to number of the uplink sub-frames in a radio frame, so that numbers of FDD downlink sub-frames corresponding to respective uplink sub-frames indicated by the TDD uplink and downlink reference configuration are substantially equal, wherein the ACK/NACK information corresponding to the FDD downlink sub-frames is carried in corresponding allocated uplink sub-frame.

Furthermore, the user equipment further includes a third determination component 152 configured to determine ACK/NACK information, corresponding to the FDD downlink sub-frames, carried in the uplink sub-frames indicated by the TDD uplink and downlink configuration, according to a result of allocating the FDD downlink sub-frames by the second determination component 151. Correspondingly, the user equipment further includes a communication component 153 configured to receive the ACK/NACK information in corresponding uplink sub-frames.

The foregoing embodiments have been described only taking an application scenario where a TDD carrier is a primary carrier as an example. In a practical application, the technical solutions according to the embodiments of the present invention will also be applicable to an application scenario where an FDD carrier is a primary carrier and a scenario where there is only an FDD carrier in the system, that is, only a part of uplink sub-frames in an FDD uplink carrier are available for transmission of ACK/NACK information, so a repeated description thereof will be omitted here.

In summary, in the embodiments of the present invention, a PDSCH HARQ feedback solution has been devised in an application scenario where a TDD carrier is aggregated with an FDD DL carrier, wherein the user equipment allocates ACK/NACK information, corresponding to the FDD downlink sub-frames, to the uplink sub-frames indicated by the chose TDD uplink and downlink reference configuration an HARQ feedback timing for PDSCH of the FDD downlink carrier, according to the number of uplink sub-frames, indicated by the chose TDD uplink and downlink reference configuration, in a radio frame based upon the TDD uplink and downlink reference configuration, so that the numbers of FDD downlink sub-frames corresponding to ACK/NACK information carried by the respective uplink sub-frames indicated by the TDD uplink and downlink reference configuration are substantially equal, and further the ACK/NACK information allocated to the respective uplink sub-frames is fed back in the uplink sub-frames; and correspondingly the base station receives the ACK/NACK information fed back from the user equipment side in an alike way. Thus the user equipment can feed back the ACK/NACK information corresponding to downlink data timely and accurately to the base station, so that the base station can retransmit the data accurately according to the obtained ACK/NACK information to thereby guarantee effectively the performance of the system. Moreover, with the allocation method according to the embodiment of the present invention, the ACK/NACK information can be allocated to the TDD uplink sub-frames as uniformly as possible to thereby make the resources in the system to be allocated more evenly.

Those skilled in the art shall appreciate that the embodiments of the present invention can be embodied as a method, a system or a computer program product. Therefore the present invention can be embodied in the form of an all-hardware embodiment, an all-software embodiment or an embodiment of software and hardware in combination. Furthermore, the present invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the present invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or another programmable device provide steps for performing the functions specified in the flow(s) of the flow chart and/or the block(s) of the block diagram.

Although the preferred embodiments of the present invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the present invention.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

What is claimed is:

1. A method for allocating sub-frames for a Hybrid Automatic Repeat Request, HARQ, comprising:
    choosing a Time Division Duplex, TDD, uplink and downlink reference configuration used to determine an HARQ feedback timing for Physical Downlink Shared Channel, PDSCH, of a Frequency Division Duplex, FDD, downlink carrier; and
    allocating FDD downlink sub-frames to uplink sub-frames indicated by the TDD uplink and downlink reference configuration, according to number of the uplink sub-frames in a radio frame, so that numbers of FDD downlink sub-frames corresponding to respective uplink sub-frames indicated by the TDD uplink and downlink reference configuration are substantially equal, wherein Acknowledgement/Negative Acknowledgement, ACK/NACK, information corresponding to the FDD downlink sub-frames is carried in corresponding allocated uplink sub-frame.

2. The method according to claim 1, allocating FDD downlink sub-frames to uplink sub-frames indicated by the TDD uplink and downlink reference configuration, according to number of the uplink sub-frames in a radio frame comprises:
    allocating $\lceil 10/N_{UL} \rceil$ FDD downlink sub-frames to each of $N_{more}$ uplink sub-frames among the uplink sub-frames, indicated by the TDD uplink and downlink reference configuration, in a radio frame; and
    allocating $\lfloor 10/N_{UL} \rfloor$ FDD downlink sub-frames to each of $N_{less}$ uplink sub-frames among the uplink sub-frames, indicated by the TDD uplink and downlink reference configuration, in the radio frame;
    wherein $N_{UL}$ represents the number of uplink sub-frames, indicated by the TDD uplink and downlink reference configuration, in a radio frame, $N_{more}=\mathrm{mod}(10,N_{UL})$, $N_{less}=N_{UL}-N_{more}$, and the total of FDD downlink sub-frames corresponding to the $N_{UL}$ uplink sub-frames, indicated by the TDD uplink and downlink reference configuration, in a radio frame is 10.

3. The method according to claim 2, wherein allocating $\lceil 10/N_{UL} \rceil$ FDD downlink sub-frames to each of $N_{more}$ uplink sub-frames among the uplink sub-frames, indicated by the TDD uplink and downlink reference configuration, in a radio frame further comprises:
    allocating for a first part of uplink sub-frames in sets of consecutive uplink sub-frames included in the uplink sub-frames, indicated by the TDD uplink and downlink reference configuration, in the radio frame, $\lceil 10/N_{UL} \rceil$ FDD downlink sub-frames respectively, wherein total number of the first parts of uplink sub-frames in all the sets of consecutive uplink sub-frames in the radio frame is $N_{more}$; and
    allocating $\lfloor 10/N_{UL} \rfloor$ FDD downlink sub-frames to each of $N_{less}$ uplink sub-frames among the uplink sub-frames, indicated by the TDD uplink and downlink reference configuration, in the radio frame further comprises:
    allocating for a second part of uplink sub-frames in the sets of consecutive uplink sub-frames in the uplink sub-frames, indicated by the TDD uplink and downlink reference configuration, in the radio frame, $\lfloor 10/N_{UL} \rfloor$ FDD downlink sub-frames respectively, wherein total number of the second parts of uplink sub-frames in all the sets of consecutive uplink sub-frames in the radio frame is $N_{less}$.

4. The method according to claim 1, wherein allocating FDD downlink sub-frames to uplink sub-frames indicated by the TDD uplink and downlink reference configuration, according to number of the uplink sub-frames in a radio frame comprises:
    allocating ACK/NACK information corresponding to the FDD downlink sub-frame n-k to the uplink sub-frame n indicated by the TDD uplink and downlink reference configuration, wherein k∈K, and:
    if the TDD uplink and downlink reference configuration is TDD uplink and downlink configuration 0, then K={6, 5} with n=2 and 7, K={5,4} with n=3 and 8, and K={4} with n=4 and 9;
    or
    if the TDD uplink and downlink reference configuration is TDD uplink and downlink configuration 1, then K={7, 6,5} with n=2 and 7, and K={5,4} with n=3 and 8;
    or if the TDD uplink and downlink reference configuration is TDD uplink and downlink configuration 2, then K={8, 7,6,5,4} with n=2 and 7;

or if the TDD uplink and downlink reference configuration is TDD uplink and downlink configuration 3, then K={11, 10,9,8} with n=2, K={8,7,6} with n=3, and K={6,5,4} with n=4;

or if the TDD uplink and downlink reference configuration is TDD uplink and downlink configuration 4, then K={12, 11,10,9,8} with n=2, and K={8,7,6,5,4} with n=3;

or if the TDD uplink and downlink reference configuration is TDD uplink and downlink configuration 5, then K={13, 12,11,10,9,8,7,6,5,4} with n=2;

or if the TDD uplink and downlink reference configuration is TDD uplink and downlink configuration 6, then K={7, 6} with n=2, K={6,5} with n=3 and 7, and K={5,4} with n=4 and 8.

5. The method according to claim 1, wherein the method further comprises:

determining ACK/NACK information of FDD downlink sub-frames to be carried in uplink sub-frames indicated by the TDD uplink and downlink reference configuration according to a result of sub-frames allocation; and transmitting the ACK/NACK information in corresponding uplink sub-frames.

6. The method according to claim 1, wherein the method further comprises:

determining ACK/NACK information of FDD downlink sub-frames to be carried in uplink sub-frames indicated by a TDD uplink and downlink reference configuration, according to a result of allocating the FDD downlink sub-frames; and receiving the ACK/NACK information in corresponding uplink sub-frames.

7. A device for allocating sub-frames for a Hybrid Automatic Repeat ReQuest, HARQ, wherein the device comprises:

a first determination component configured to choose a Time Division Duplex, TDD, uplink and downlink reference configuration used to determine an HARQ feedback timing for Physical Downlink Shared Channel, PDSCH, of a Frequency Division Duplex, FDD, downlink carrier; and a second determination component configured to allocate FDD downlink sub-frames to uplink sub-frames indicated by the TDD uplink and downlink reference configuration, according to number of the uplink sub-frames in a radio frame, so that numbers of FDD downlink sub-frames corresponding to respective uplink sub-frames indicated by the TDD uplink and downlink reference configuration are substantially equal, wherein Acknowledgement/Negative Acknowledgement, ACK/NACK, information corresponding to the FDD downlink sub-frames is carried in corresponding allocated uplink sub-frame.

8. The device according to claim 7, wherein the second determination component is further configured:

allocate $\lceil 10/N_{UL} \rceil$ FDD downlink sub-frames to each of $N_{more}$ uplink sub-frames among the uplink sub-frames, indicated by the TDD uplink and downlink reference configuration, in a radio frame; and allocate $\lfloor 10/N_{UL} \rfloor$ FDD downlink sub-frames to each of $N_{less}$ uplink sub-frames among the uplink sub-frames, indicated by the TDD uplink and downlink reference configuration, in the radio frame;

wherein $N_{UL}$ represents the number of uplink sub-frames, indicated by the TDD uplink and downlink reference configuration, in a radio frame, $N_{more}=\mod(10,N_{UL})$, $N_{less}=N_{UL}-N_{more}$, and the total of FDD downlink sub-frames corresponding to the $N_{UL}$ uplink sub-frames, indicated by the TDD uplink and downlink reference configuration, in a radio frame is 10.

9. The device according to claim 8, wherein the second determination component is further configured:

to allocate for a first part of uplink sub-frames in sets of consecutive uplink sub-frames included in the uplink sub-frames, indicated by the TDD uplink and downlink reference configuration, in the radio frame, $\lceil 10/N_{UL} \rceil$ FDD downlink sub-frames respectively, wherein total number of the first parts of uplink sub-frames in all the sets of consecutive uplink sub-frames in the radio frame is $N_{more}$; and to allocate for a second part of uplink sub-frames in the sets of consecutive uplink sub-frames in the uplink sub-frames, indicated by the TDD uplink and downlink reference configuration, in the radio frame, $\lfloor 10/N_{UL} \rfloor$ FDD downlink sub-frames respectively, wherein total number of the second parts of uplink sub-frames in all the sets of consecutive uplink sub-frames in the radio frame is $N_{less}$.

10. The device according to claim 7, wherein the second determination component is further configured:

to allocate ACK/NACK information corresponding to the FDD downlink sub-frame n-k to the uplink sub-frame n indicated by the TDD uplink and downlink reference configuration, wherein k∈K, and:

if the TDD uplink and downlink reference configuration is TDD uplink and downlink configuration 0, then K={6, 5} with n=2 and 7, K={5,4} with n=3 and 8, and K={4} with n=4 and 9;

or if the TDD uplink and downlink reference configuration is TDD uplink and downlink configuration 1, then K={7, 6,5} with n=2 and 7, and K={5,4} with n=3 and 8;

or if the TDD uplink and downlink reference configuration is TDD uplink and downlink configuration 2, then K={8, 7,6,5,4} with n=2 and 7;

or if the TDD uplink and downlink reference configuration is TDD uplink and downlink configuration 3, then K={11,10,9,8} with n=2, K={8,7,6} with n=3, and K={6,5,4} with n=4;

or if the TDD uplink and downlink reference configuration is TDD uplink and downlink configuration 4, then K={12, 11,10,9,8} with n=2, and K={8,7,6,5,4} with n=3;

or if the TDD uplink and downlink reference configuration is TDD uplink and downlink configuration 5, then K={13, 12,11,10,9,8,7,6,5,4} with n=2;

or if the TDD uplink and downlink reference configuration is TDD uplink and downlink configuration 6, then K={7, 6} with n=2, K={6,5} with n=3 and 7, and K={5,4} with n=4 and 8.

11. The device according to claim 7, wherein the device comprises:

a third determination component configured to determine ACK/NACK information of FDD downlink sub-frames to be carried in uplink sub-frames indicated by a TDD uplink and downlink reference configuration, according to a result of allocating the FDD downlink sub-frames; and a communication component configured to transmit the ACK/NACK information in corresponding uplink sub-frames.

12. The device according to claim 7, wherein the device comprises:

a third determination component configured to determine ACK/NACK information of FDD downlink sub-frames to be carried in uplink sub-frames indicated by a TDD uplink and downlink reference configuration, according to a result of allocating the FDD downlink sub-frames; and a communication component configured to receive the ACK/NACK information in corresponding uplink sub-frames.

\* \* \* \* \*